United States Patent
Holtz et al.

(10) Patent No.: US 10,129,604 B2
(45) Date of Patent: Nov. 13, 2018

(54) ANALYTIC SYSTEM FOR AUTOMATICALLY COMBINING ADVERTISING AND CONTENT IN MEDIA BROADCASTS

(71) Applicant: GVBB HOLDINGS S.A.R.L., Luxembourg (LU)

(72) Inventors: Alex Holtz, Suwanee, GA (US); Charles Meyer, Nevada City, CA (US)

(73) Assignee: GVBB HOLDINGS S.A.R.L., Luxembourg (LU)

(*) Notice: Subject to any disclaimer, the term of this patent is extended or adjusted under 35 U.S.C. 154(b) by 0 days.

(21) Appl. No.: 14/922,681

(22) Filed: Oct. 26, 2015

(65) Prior Publication Data
US 2017/0118533 A1    Apr. 27, 2017

(51) Int. Cl.
| H04N 21/81 | (2011.01) |
| G06Q 30/02 | (2012.01) |
| H04N 21/25 | (2011.01) |
| H04N 21/466 | (2011.01) |

(52) U.S. Cl.
CPC ....... H04N 21/812 (2013.01); G06Q 30/0241 (2013.01); G06Q 30/0251 (2013.01); G06Q 30/0255 (2013.01); G06Q 30/0269 (2013.01); G06Q 30/0276 (2013.01); H04N 21/252 (2013.01); H04N 21/4667 (2013.01)

(58) Field of Classification Search
None
See application file for complete search history.

(56) References Cited

U.S. PATENT DOCUMENTS

| 6,698,020 B1 | 2/2004 | Zigmond et al. |
| 2009/0018917 A1 | 1/2009 | Chapman et al. |
| 2010/0312741 A1 | 12/2010 | Roegner |
| 2011/0102600 A1* | 5/2011 | Todd ............... H04N 17/004 348/180 |
| 2011/0314495 A1* | 12/2011 | Zenor ............... G06Q 30/02 725/34 |
| 2013/0238777 A1* | 9/2013 | Raleigh ............ H04L 67/1097 709/223 |
| 2014/0006930 A1* | 1/2014 | Hollis ............... G06F 17/2247 715/234 |
| 2014/0150016 A1* | 5/2014 | Feng ................ H04N 21/4788 725/34 |

OTHER PUBLICATIONS

International Search Report & Written Opinion issued in PCT/EP2016/066367 dated Aug. 25, 2016.

* cited by examiner

*Primary Examiner* — Omar S Parra
(74) *Attorney, Agent, or Firm* — Arent Fox LLP

(57) ABSTRACT

An analytic platform, article of manufacture, system, computer-readable medium, and method for selecting and inserting advertisements for delivery to a content viewing device. A plurality of advertising metrics are generated from data originating from a plurality of content viewing devices. Then, an advertisement is selected for presentation along with content directed to one of the content viewing devices, the advertisement being selected based on the advertising metrics. Once selected, the advertisement is added to the content for delivery to said one of the content viewing devices.

7 Claims, 7 Drawing Sheets

ANALYTIC SYSTEM FOR AUTOMATICALLY COMBINING ADVERTISING AND CONTENT IN MEDIA BROADCASTS

BACKGROUND

Field

The present disclosure relates generally to information management in media broadcasting and advertisement insertion, and more particularly, using analytic data to automatically select and insert targeted advertisements in combination with media content leveraging multiple analytic sources to derive return-on-investment (ROI) results for campaigns across all platforms including connected TV, web, mobile and social platforms.

Background

Media content providers, such as national television networks and television station groups, have evolved to serve the demand for online viewing across various formats. Consequently, in addition to regular television broadcasts of programs, the same content may be streamed over the internet as video on demand and/or live streaming. Examples of delivery formats include over the top (OTT) bypassing typical "managed services" such as cable, satellite and IPTV infrastructure that can be subscription and/or transaction based or ad supported, online video platforms (OVP) such as YouTube, and TV Everywhere used by "managed services" providers to provide their subscribers access to their content on connected TV, web and mobile devices for both live and pre-recorded broadcasts.

Traditional approaches to advertising and monetization are becoming ineffective and outdated due to the evolving manner in which media is presented to viewers.

SUMMARY

A method, article of manufacture, system, apparatus, and computer-readable medium are provided to enable an analysis of an optimized return on investment for advertisement campaigns and of content creation in order to determine an effective combination of advertisement placement and content on the best combination of delivery platforms. Advertising may be served in live streams, "as-live" such as channel playout and/or on-demand. Advertising may be of a select duration that best serves the delivery platform of choice, time of day, content type that it is being associated with and targeted as determined by the campaign objectives and profile definition.

Aspects are provided that gather all sources of analytic data to be used to analyze, derive and deliver the best ROI campaign results for advertisers, allow broadcasters to provide the best creative programming and determine the best combination of platforms to deliver, monitor, report and monetize results and target both advertising and specific content on a unique, per viewer basis. Different algorithms may be used to provide suitable analysis for maximizing ROI, and different data gathering methods may be employed to provide the basis for analysis. Beyond inserting existing content, ROI can be increased further by responding to the data analysis with personally created content including, but not limited to, keyed in coupons, or purchase incentives, as web-links or email subscription, either on-screen, or in traditional lower third, or pillar box location, personalized menus of program choices, or automatically selected programs feeds, based on genre and psychographic data profiles.

The method and system may use analytic data to automatically select and insert targeted advertisements in combination with media content leveraging multiple analytic sources to derive return-on-investment (ROI) results for campaigns across multiple platforms including connected TV, web, mobile and social platforms. An advertiser will then be able to create a campaign with the best combination of ad creative, content type and target platforms. The broadcaster will be able to gain insights into content categories and type that best drive ROI therefore providing their advertising customers with the best campaign results.

Aspects may include means for generating a plurality of advertising metrics from data originating from a plurality of content viewing devices, means for selecting an advertisement for content directed to one of the content viewing devices, the advertisement being selected based on the advertising metrics; and means for adding the selected advertisement to the content for delivery to said one of the content viewing devices.

The means for selecting an advertisement may be configured to select the advertisement from a plurality of advertisements. The means for selecting an advertisement may be configured to select the advertisement based on any of an advertising profile for the advertisement, metadata for content with which the advertisement is inserted, and/or information regarding the playout of the content at one of the content viewing devices. At least a portion of the data may originate from any of a social media application on one of the content viewing devices, a search application on one, or more of the content viewing devices, and/or a television connected to a packet based network via any method of access such as a set-top-box, cable modem access, smart-tv internet access built into the TV itself, or any other interact access method.

Aspects may further include any of means for deriving return on investment for adding the selected advertisement to the content, the return on investment being derived from the advertising metrics, means for deriving pricing for adding the selected advertisement to the content, the pricing being derived from the advertising metrics, means for creating content based on the advertising metrics and/or means for providing specific content based on the advertising metrics. Advertising metrics may include a quality of experience (QoE) associated with each of the content viewing devices.

Aspects may further include means for deriving return on investment for adding the selected advertisement to the content, the return on investment being based on one or more of the quality of experience associated with said one of the content viewing devices, the measurable actions, such as web link clicks, on said one of the content device, and the audited purchase behavior measure by the commissioning associated with a purchase connected to the web-link, or coupon enabled transaction.

Additional advantages and novel features of these aspects will be set forth in part in the description that follows, and in part will become more apparent to those skilled in the art upon examination of the following or upon learning by practice of the invention.

DETAILED DESCRIPTION

Figure 1:
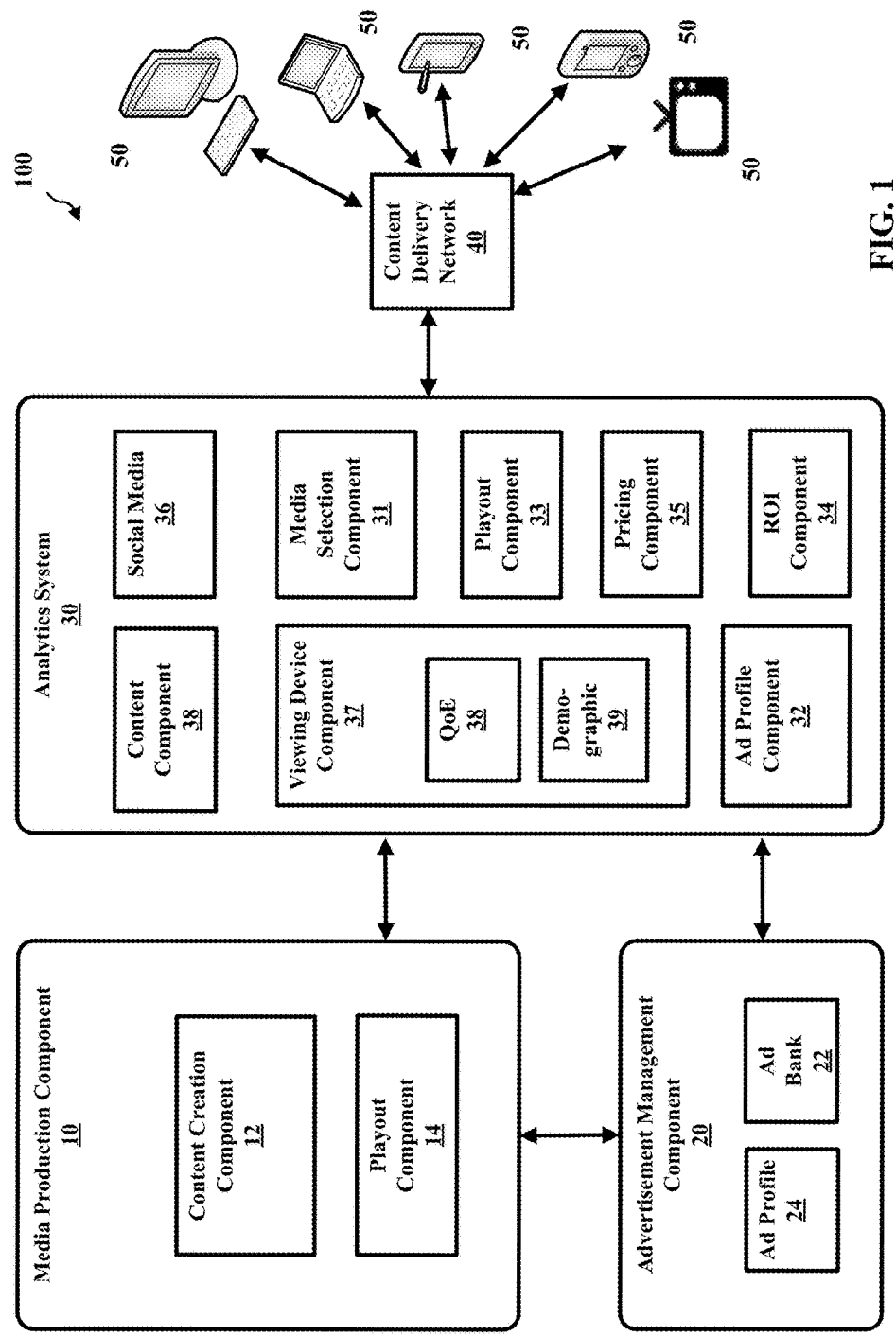
FIG. 1 illustrates an example a system 100 for automatically selecting advertisements for delivery along with media content in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Advertising revenue for content providers may be obtained from advertisers for advertising campaigns, e.g., with fixed budgets. Content providers may improve advertising sales by demonstrating an accurate and optimized return on investment (ROI) for such advertising campaigns. Moreover, demand for advertising may be increased by effective ad selection and placement, and creative content that draws persistent viewers. Traditional methods for determining effective advertisement placements and advertisement pricing are becoming obsolete with the combined delivery of television programming and online streaming. In addition, different target groups have various viewing preferences and different responses to advertisement types, further complicating management of advertising sales.

As described herein, analytics may be a key driver for broadcasters. An analysis of multiple data sources, certain types of which are referred to as big data, may assist broadcasters in calculating an ROI for advertisement agencies. Such an ROI may be predicted (pre-sales) for use in filling advertisement spots in a broadcast or post-sales in order to show the actual benefit derived from the advertisement/advertisement campaign.

Metadata, e.g., metadata associated with media content, may be processed throughout the broadcast production chain and may be used in combination with the analytics as well as traffic and billing information in order to generate more accurate ROI metrics for selling ad avails, e.g., advertisement spots in a broadcast, to ad agencies.

An automated process enables an accurate and up to date calculation and allows advertising metrics to be continually updated. The analytics may be generated using data from a number of sources, including data mined, or received, from an OVP video player client on content viewing devices. Among other types of content viewing devices, this data may be received for web, mobile, or connected TVs. For example, OVP/OTT TV Everywhere (e.g., authenticated streaming or authenticated video on-demand) mine analytic data and return the data, e.g., to an analytics system. This analytics system may be a part of a broadcast system. The received analytic data may be analyzed, reported, and used to generate advertising metrics for use in advertisement selection and advertisement sales. Through an automated process for calculating an ROI, advertising metrics may be generated and maintained and used to decide a best fit placement for an advertisement.

In addition calculating and reporting an ROI for advertisement placement for advertisers, aspects may further include selecting and/or generating best fit content and its associated ROI for broadcasters. This data, analyzed in combination with content metadata, enables an identification of content that works best with a particular advertisement and demographic along with the pricing information from traffic & billing. This may include an automatic calculation of an ROI for the broadcaster and/or potential advertiser.

As presented herein, analytics may also be used in video streaming optimization. For example, Internet infrastructure and CDNs may be monitored along with website and application performance to determine a quality of experience (QoE) at a content viewing device. This QoE data may be collected by the analytics system and used to identify and reroute video streams in order to improve or optimize QoE. For example, video streams may be rerouted through the paths of least resistance and/or paths with a highest level of performance. The use of such an automated process provides an analytics platform that provides vendors significant value because QoE is a key metric to drive more consumer viewership and higher cost per impression (CPI) or cost per thousand impressions (CPM).

Aspects provided herein provide an article of manufacture, such as an analytics system providing an intelligent, automated content and advertisement selection and sales management solution.

Aspects include the generation and maintenance of advertising metrics used to automatically drive advertisement decisions and insertion into a content transmission. Advertising metrics may be generated using analytics and data from OVP, OTT, or TV Everywhere, etc. type content viewing devices. Advertising metrics may be generated and maintained using analytics and data from social media video publishing. Such social media data may include measurements of pre-production, production and post campaign impact illustrating the effectiveness of at least one particular campaign throughout its process as compared to other content and served advertisements.

Aspects may include the generation and maintenance of advertising metrics for use in automatically performing an ROI analysis for advertisement pricing and sales. Performance metrics may be received and used to update the advertising metrics. Such performance measurements may include, e.g., information regarding demographics, geo-location, client profiles, content served with/adjacent to the advertisement, time of day of the advertisement, advertisement category type, such as "exclusive", "targeted" or "non-targeted," whether the content was live streaming or on-demand, sources, i.e. broadcaster website, mobile app, connected TV and/or syndicated sites and "creative", i.e. identifying creative aspects of the content and/or advertisement that evoked a positive response such as selecting suggested programming or responding to commissionable advertising. Pricing information and analytics may be received and used to update the advertising metrics. Pricing data may include, e.g., data derived from historical performances based on different pricing models. The analytics system may use this historical pricing information to automatically determine a best pricing ROI for an advertisement/advertisement campaign. For example, an optimum pricing ROI may be determined for a specific content type, creative and placement.

Aspects may include the generation and maintenance of advertising metrics for use in automatically driving content creation, selection and programming mix. For example, data regarding historical programming and sales may be used to automatically identify and prioritize the topics that best perform for both viewership and revenue. This identification may be automatically generated and used in a broadcast system to trigger the creation of content for the identified topics. The identification and prioritization of content topics may also be based on social media information. For example, historical social media campaign metrics may be used to automatically identify topics or story categories performs best through certain social media campaigns and sites. Examples of social media include, among others, social networks, blogs, business networks, enterprise social networks, forums, microblogs, photo sharing, products/services review, social bookmarking, social gaming, social networks, video sharing and virtual worlds. Examples of social media include, e.g., Facebook®, Twitter®, Pinterest®, Google+®, YouTube®, Texting, Interactive Voice Response (Call Ins), etc. The social media information may identify not only topics that are trending, but may also indicate factors of engagement, demographic information for the people discussing/viewing such social media content, etc.

Social media information may include pre-campaign, during campaign, and post-campaign information. Such information may include a number of "likes," "shares," views, recalls, exposure, etc. for each period of time. A trending peak may be identified for a particular time.

Aspects may include the generation and maintenance of advertising metrics for use in automatically drive performance optimization. Performance optimization may be measured using QoE. Thus, aspects may include, e.g., real time monitoring of infrastructure, CDNs, websites, mobile apps and connected TVs to optimize QoE. This may also include automating a selection in real time of which CDN to use for content/advertisement transmission/delivery, what bitrate to stream for any given video player based on pre-selected destination profiles, etc. Aspects may include continuous monitoring allowing automated dynamic changes to Internet routing and best stream profile served to maximize QoE. This data and metrics can then be used to update the ROI calculation as performance improves.

In addition to receiving QoE information for content viewing devices, viewer histories may be received from a video player on a content viewing device.

The analytics and metrics involved in these determinations may be automatically updated on an ongoing basis. Thus, data may continually be received and used to update the advertising metrics.

FIG. 1 illustrates example aspects of a system 100 for automatically selecting advertisements for delivery along with media content. System 100 may also be configured to identify content for creation.

A media production component 10 creates, stores, and/or provides media content for delivery to any of a number of content viewing devices 50. Delivery of media content is also referred to herein as playout or transmission of such content.

Media production includes the production of any and all forms of media or multimedia. A media production, also referred to herein as "media content" or "content" includes, but is not limited to, news programs, television programming (such as, documentaries, situation comedies, dramas, variety shows, interviews, or the like), sporting events, concerts, infomercials, movies, video rentals, government content, public service content, corporate content, educational content, retail sales content, community content, or any other content. For example, and without limitation, media productions can include streaming video related to corporate communications and training, educational distance learning, or home shopping video-based "e" or "t"-commerce. Media productions may also include live or recorded audio (including radio broadcast), video, graphics, animation, computer generated, text, and other forms of media and multimedia. Media productions may also include combinations of the foregoing.

Media content may be presented in any of various formats, including, among others, live, OTT, OVP, VoD, TV everywhere, over social media, via traditional broadcast, etc.

Media productions may be encoded and transmitted over a computer network, such as the global Internet, a local intranet, private virtual networks, or any other computer or communication network, medium, and/or mode, as well as over a traditional broadcast medium including, over-the-air, digital broadcast satellite (DBS), terrestrial cable, etc. As such, aspects presented herein support distributions to a recipient's television, enhanced digital television, monitor or other display, as well as over wired and/or wireless communication or computer networks (e.g., the World Wide Web) onto a personal computer (PC), laptop, mobile tablet, mobile phone, connected TV or other display or data processing or communication device. Thus content viewing devices 50 are illustrated as being various types of viewing devices.

"On-demand" content may be recorded or produced at a hosting facility (e.g., television station, radio station, newspaper, webcasting/online only station, private homepage or web site, or other media "hosting" environment(s)), segmented, categorized, and indexed for retrieval and viewing.

"Live or as-live broadcast" may comprise a media production broadcast over traditional airwaves or other mediums (e.g., cable, satellite, etc.) to a television set. At the same time (or substantially the same time), the production may be encoded for distribution over a computer/communication network. The production for distribution over a computer/communication network may be modified, e.g., segmented and/or enhanced. The traditional and network distribution modes/methods may be synchronized and transmitted substantially at the same time, or they can be distributed at different times. The distribution can be live or repurposed from previously stored media. The media production may be distributed only via a traditional medium. In another example, the media production may be distributed only over a computer network. In another example, they may be distributed multiple times, in a synchronized and/or unsynchronized manner. In an example, the computer network may include the Internet, and the enhanced media is formatted in hypertext markup language (HTML/HTML5) or other formats including but not limited to Apple HLS, Microsoft Smooth Streaming, Adobe HDS and/or the approved International standard, MPEG-DASH for distribution over the World Wide Web.

Advertisements may be presented to a viewer at a content viewing device along with the content.

Advertisements may include video or audio commercials; dynamic or static displays; sponsorship advertisements; still images, public service messages; community messages; government messages; pre-roll, post-roll, mid-roll advertisements; active or passive advertisements; skyscrapers; email correspondence; or like forms of media and multimedia promotions. It is noted that the term "advertisement" as used herein includes any type of message and content.

Video or audio commercials can be integrated into a media stream such that the commercial feed can be presented to the user while the user views the media production. For example, the commercial feed can be presented after one or more news stories, at the beginning of the media production, at the end, between scenes within a video production, or at any other place designated by the video producer/director or automated through the intelligence of the system pre-programmed to specific rules, pre-determined profiles and historically driven and learned artificial intelligence.

The advertisements may also include banners (sometimes referred to as "display" advertising). A display, or banner, includes any combination of text, graphics and other forms of media and multimedia that promotes a good or service, or otherwise provides information or an announcement. The display can be strictly descriptive, or include hypertext, a hot spot, or a hyperlink to open additional display, place an order, or send a request for additional information to the server of the hosting facility or another server. The display can include a hyperlink to any pre-defined destination. The display can be a static display that only displays the promotional advertisement. However, the display can also be an active display that blinks, spins, fades, and the like. The display can also be a scrolling display that includes a scroll bar that allows the user to move through contents of the display. Resizable displays can also be used to allow the user to expand or enlarge the display to receive more data. The aforementioned is a representative list of displays that can be used with the present invention, it should be understood that any other type of display capable of promoting a product or conveying a message or content, including, but not limited to, displays developed with Macromedia® Flash™ or Macromedia® Shockwave®, or the like, as would be apparent to one skilled in the relevant art(s), could be easily included and would not change the scope of the invention.

The advertisements can also be active or passive. An active advertisement requires or permits interaction from the user, such as clicking-through, scrolling and the like. Passive advertisements are displayed and require no interaction from the user. Additionally, the advertisements can take the form of pre-roll, mid-roll or post-roll advertisements. Such advertisements may comprise, for example, commercials, displays, or the like that are transmitted to the display device prior to the startup of the media production or served "server-side" such that the ad is delivered or streamed to the video player already inserted or "stitched" together for both live and on-demand content applications.

Advertisements may be "exclusive," "targeted" or "non-targeted," for example. Exclusive advertisements may be served with a specified topic or category. Exclusive advertisements may be, for example, served with on-demand media productions, and may be linked to a media production by a topic or category that has been established for the media production. Exclusive advertisements might not be rotated among other advertisements. As such, exclusive advertisements may be sold at a premium price, and the exclusive display, button, video, or the like is displayed with the specified topic or category throughout the duration of the linked media production or a segment thereof.

Targeted advertisements may also be served with a specified topic or category. However, unlike exclusive advertisements, targeted advertisements may be rotated among other targeted advertisements. In one example, display or button advertisements may be rotated in and out on a ten-second interval, although intervals of other durations are contemplated by the invention. With respect to video or audio-streaming advertisements, such advertisements may be rotated with other targeted streaming advertisements. Targeted advertisements may also be sold at a premium price, but at a lower price than exclusive advertisements.

Non-targeted advertisements may be served without regard to a specified topic or category, and may therefore be sold at a lower price than targeted advertisements. Additionally, non-targeted advertisements are rotated among other non-target advertisements.

As such, aspects presented herein support all types of advertisements that can be transmitted over a client-server network to a display device. In one example, as a video show is being transmitted, the advertisements may be streamed at specified intervals and durations with the video show. In an example, the advertisements may be presented on the side panels of the same frame or window in which the video show is displayed. In another example, the advertisements may be streamed in separate frames. In another example, the advertisements may be streamed prior to the display of the related segment video. The advertisements may also include a hyperlink to a web site for the sponsor of the advertisement. Aspects presented herein may include any combination of the above.

Aspects presented herein enable advertisements, in various formats, to be linked and integrated with a media production. Several methodologies and/or techniques are available for selecting and integrating the advertisements into the media production. The advertisements can be embedded directly into the media production as an introductory piece, at a break within the media production, and/or at the end of the media production. The parallel distribution of the advertisements can be implemented by presenting the advertisement in another window, frame, or region.

Linear advertisements may be located before, during (i.e., commercial breaks), and after a media production. Linear advertisements may include audio and/or video commercials, public service announcements, and other contents, as described above, that are served in series with the media production. Non-linear advertisements may be simultaneously displayed during the presentation of media production. Non-linear advertisements may include displays, buttons, audio/video content, and the like that are located in a separate region, frame, or window than the media production. Non-linear advertisements may support a combination of serial and parallel servicing. In other words, non-linear advertisements may be served in parallel with the media production, but in series with other non-linear advertisements.

In FIG. 1, system 100 includes an advertisement management component 20. This advertisement management component may include an ad bank 22 that stores advertisements to be presented to viewers. In addition to the advertisements, the advertisement management component 20 may comprise an advertising profile component 24 that stores an advertising profile associated with each of the corresponding advertisements in the ad bank 22.

An advertising profile for an advertisement may comprise, among other profile parameters, demographics, geographic location, client profiles, content topic, time of day, category type, live-streaming or on-demand, source, creative information. The category type may indicate whether the advertisement is exclusive, targeted, non-targeted, etc. The source may include, e.g., a broadcaster website, mobile application, connected TV and/or syndicated sites, etc. Creative information may include, e.g., content category, type, source, origination date, author/editor/producer/director, or other metadata description, etc.

System 100 also includes an analytics system 30 that generates a plurality of advertising metrics from data originating from a plurality of content viewing devices. Analytics system 30 may dynamically update and maintain the plurality of advertising metrics based on information received from any of a number of sources. At least a portion of the data may originate from a social media application on one of the content viewing devices. Thus, the analytics system 30 includes a social media component 36 that receives information from social media and incorporates the information into the advertising metrics. A portion of the data may originate from a television connected to a packet based network. As one example, the social media module may track the number of "shares" or "likes," where viewers have shared a viewed ad or content clip with a friend. Information may be continually mined from video players on the content viewing devices in order to provide content/advertisement viewing history information to the analytics system.

Using the advertising metrics, advertisement media selection component 31 may select media to be presented along with content directed to at least one of the content viewing devices 50. In one example, the selected media may comprise content. In another example, the selected media may comprise at least one advertisement. Playout component 33 may add the selected media to the content, e.g., from content received from media production component 10 for delivery to one of the content viewing devices 50 via content delivery network (CDN) 40.

For example, an advertisement may be selected from one of the plurality of advertisements stored in advertisement bank 22.

The selection of the media, whether content or advertisement, may further be based on the advertising profile stored at advertising profile component 24 for the media. The analytics system 30 includes an advertising profile component 32 that receives/accesses the advertising profile information. The advertising profile may include, e.g., a budget, creative information, demographics for a target audience, time of day parameters, delivery platform parameters, social media platform parameters, geo-location targets, content restrictions, etc. The analytics system 30 may use its generated advertising metrics in order to analyze advertising profiles for a plurality of advertisements in the ad bank and to determine an advertisement that will provide a predicted optimum ROI. An ROI is a calculation of the benefit to the advertiser resulting in their investment in advertising.

For example, the ROI measurement may be based on an increase in sales resulting from an amount paid for advertisements or it may be based on "reach" of the targeted audience to achieve a "branding" objective or based on targeted consumer actions such as viewing duration, continued viewing during changes in programming and insertion of advertising, social media sharing parameters, click-throughs for engagement goals. The ROI may include an analysis of any of the amount of exposure to the advertisement, exposure for a particular demographic, and an amount of sales after exposure. The ROI may also consider an amount of action created. The ROI may identify a number of times that the advertisement was viewed in completion and a number of partial views for the advertisement. Partially viewed advertisements may be scaled in the ROI calculation.

The analysis may further include an analysis of the content for playout, e.g., the content to which an advertisement is being selected for delivery to a display device. Thus, analytics system includes content component 38 that receives content information for use in the selection of the advertisement. For example, content for playout may comprise associated metadata for the content. The metadata may include, among others, a content type, show and/or story title, producer/director, keywords, historical demographics, viewing times and platform of choice for like content, content association restrictions, rights management, syndication parameters, duration information, content rating, etc. Thus, the advertisement selection component 31 may select the advertisement further based on the metadata for the content that will be presented with the advertisement.

In addition to assisting in the selection of an advertisement, content component may use the advertising metrics and other information gathered by the analytics system in order to create content. For example, the content component may identify topics, distribution platforms of choice, social media "viral" sharing and trending data, content types (interview, editorial, documentary, etc.) and demographic profile, of particular interest or of particular benefit when used in combination with advertisements. This identification can be communicated to media production component for creation of the content. Thus, the analytics system not only enables a dynamic optimization of the selection of an advertisement, but also enables the creation of content to form an optimum combination of content and advertisement.

The analytics system 30 may also receive information regarding a content viewing device 50 to which the content is being delivered, e.g., via viewing device component 37. Such information may include a QoE 38 associated with each of the content viewing devices to which the content is directed. A QoE may comprise, e.g., a quality of service (QoS) performance measurement associated with, jittering, blockiness, artifacts and buffering, metrics. Viewing device information 39 may also comprise QoE type information such as information regarding the performance of infrastructure, CDNs, websites, mobile applications, content viewing devices, etc. involved in the transmission and display of content and advertisements. Viewing device information may also include other information.

For example, a local server may generate and store metadata in response to the viewer behavior and treatment of the media content, including the time of day, duration of viewing, context, category, number of views and repeated views per client, number of downloads, consumer demographics, media rotation (e.g., live or on demand), and the like. The metadata may be generated by period, show, topic, account, or the like. Page views and click-throughs represent another type of collected data. Page views refer to the actual number of web pages received by an online user. Click-throughs refer to the online user actually clicking on, for example, a display advertisement to get more information on the advertised product or acknowledge that the user has considered the advertisement. The data collected in response to page views and click-throughs include statistical data with respect to consumer demographics, linked topic and show metadata, download time of day, medium of advertisement, type of advertisement, and the like.

The media selection component 31 may select the media, e.g., advertisement or content, further based on such information regarding the viewing device.

The analytics system may include an ROI component 34 configured to derive a return on investment for adding the selected advertisement to the content. The return on investment may be derived from the advertising metrics. The ROI may be based at least in part on the QoE associated with the content viewing devices.

The analytics system 30 may also include a pricing component 35 configured to derive prices for adding the selected media, e.g., advertisement or content, to the content. The pricing may be derived from the advertising metrics. For example, data derived from historical performances based on different pricing models may be used in the determination of a best pricing ROI for a specific content type, creative, placement, etc.

System 100 may be connected to a media broadcast facility as well as to various servers including content delivery servers, ad servers, social media servers, application servers, and at least one local host server via a network.

Media content may be produced at such a media broadcast facility for a television broadcast, online streaming, and other types of delivery. Content may be generated at a live feed or may include prerecorded content. Such prerecorded content may include segments of a live broadcast.

Figure 7:
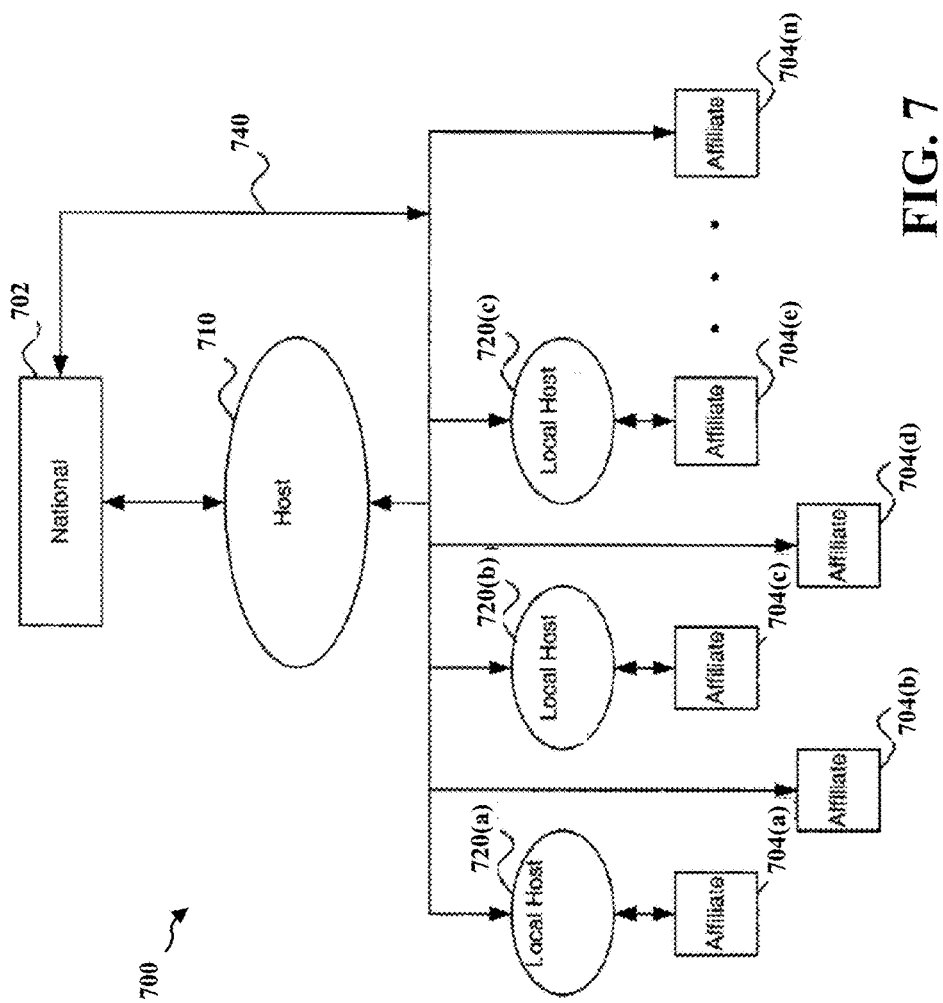
FIG. 7 illustrates an example national and affiliate system in accordance with aspects presented herein.

In a case where media broadcast facility is a parent network producing a national broadcast, content viewing devices may receive the broadcast from a local host server used by a local network affiliate, which may be configured to insert ads in the media broadcast tailored to profiles and demographics corresponding to the local viewing audience. FIG. 7 illustrates a system with a national system and local affiliate systems. Advertisements may originate from advertisement bank 22 at the media broadcast facility for ad slots reserved for the national broadcast, while local ads may originate from ad servers and/or ad banks of a local host server.

Social media servers may be used by the broadcaster for online streaming of content and ads, such as for example, a video clip or segment shown on broadcaster's Facebook page.

Application servers may be used by the broadcaster when video on demand requires an application to display the video on the content viewing devices, in which case the client may pull the application code from the application server for a one-time playback use, or the application may be cached at the content viewing device for further online video playbacks.

Figure 2:
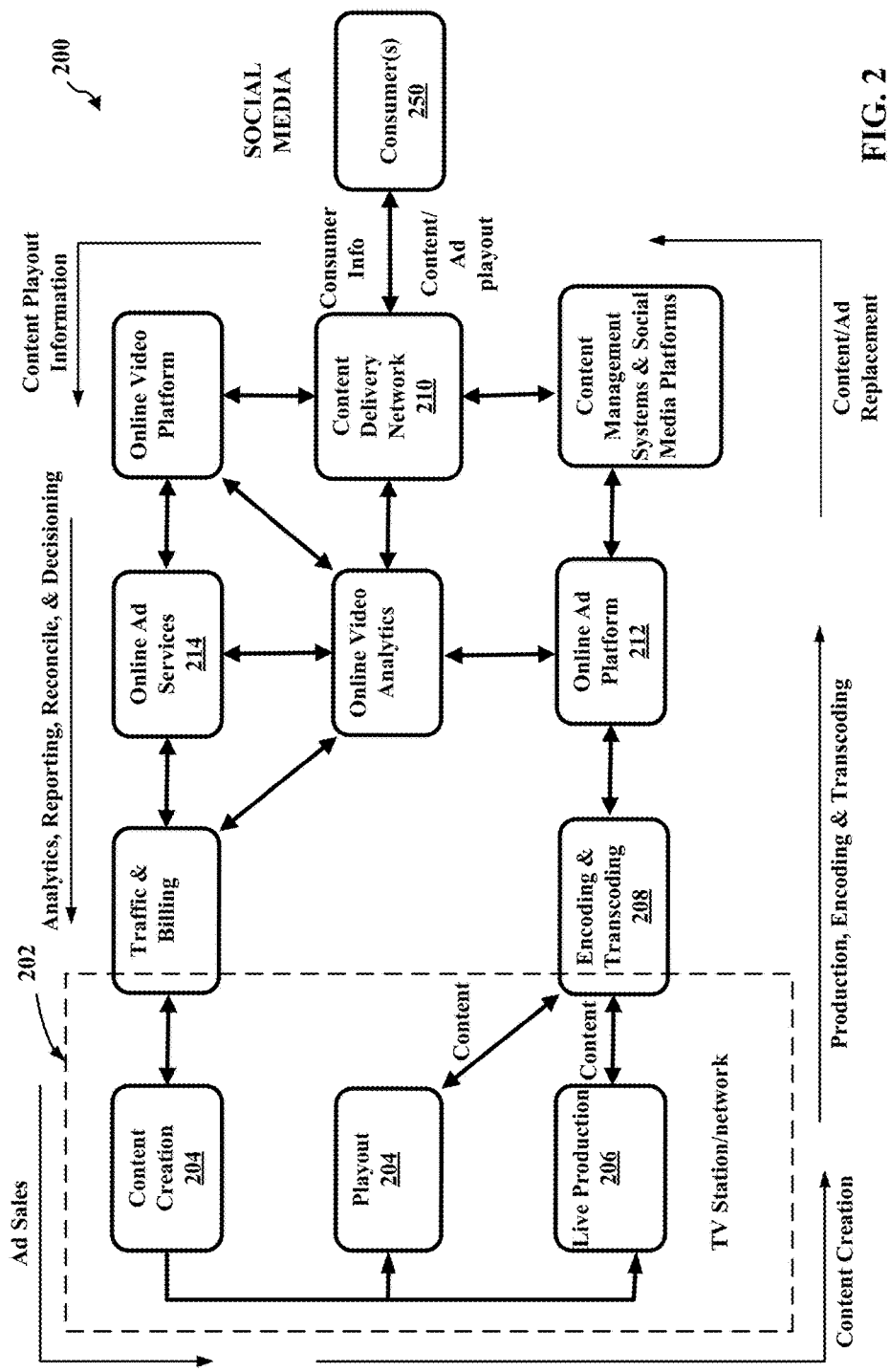
FIG. 2 is a conceptual data flow diagram illustrating the data flow between different means/components in an example system in accordance with aspects presented herein.

FIG. 2 illustrates a workflow through a system comprising an analytics system. The analytics system may include aspects similar to those described in connection with analytics system of FIG. 1.

Content creation and delivery may begin at a media content source. This may include, e.g., a network or a television station, among other sources of media content. Dashed line 202 illustrates an example network perimeter. The media content source may create content at 204. Content may comprise a live production and/or other content for playout. Segments of a live production may be stored and presented to viewers at a later time. The content undergoes encoding and transcoding at 208 for delivery to at least one content viewing device, e.g., consumer(s) 250 via contend delivery network 210.

In addition to the content, advertisements may be selected for delivery to the content viewing device. Online ad platform 212 may receive the content stream and identify segment demarcations, advertisement breaks, or other available spots for advertisements. These available sports are also referred to herein as ad avails. This information may be provided to online ad services 214 in order to select an advertisement for insertion/delivery along with the content. As described above, the content may include metadata. The content metadata may be received and provided to the online ad services 214 for use in selecting an advertisement. In one example, the online ad platform may strip metadata from the content stream for use in selecting advertisements to be delivered with the content.

Online ad services 214 may maintain continuously updated analytics as well as providing reporting, reconciling, and decisioning regarding advertisement selections and advertisement campaigns. Online ad services 214 may include a decision engine that receives and uses an advertising profile and uses dynamically updated metrics in order to deliver advertisements in an optimum manner.

Figure 3:
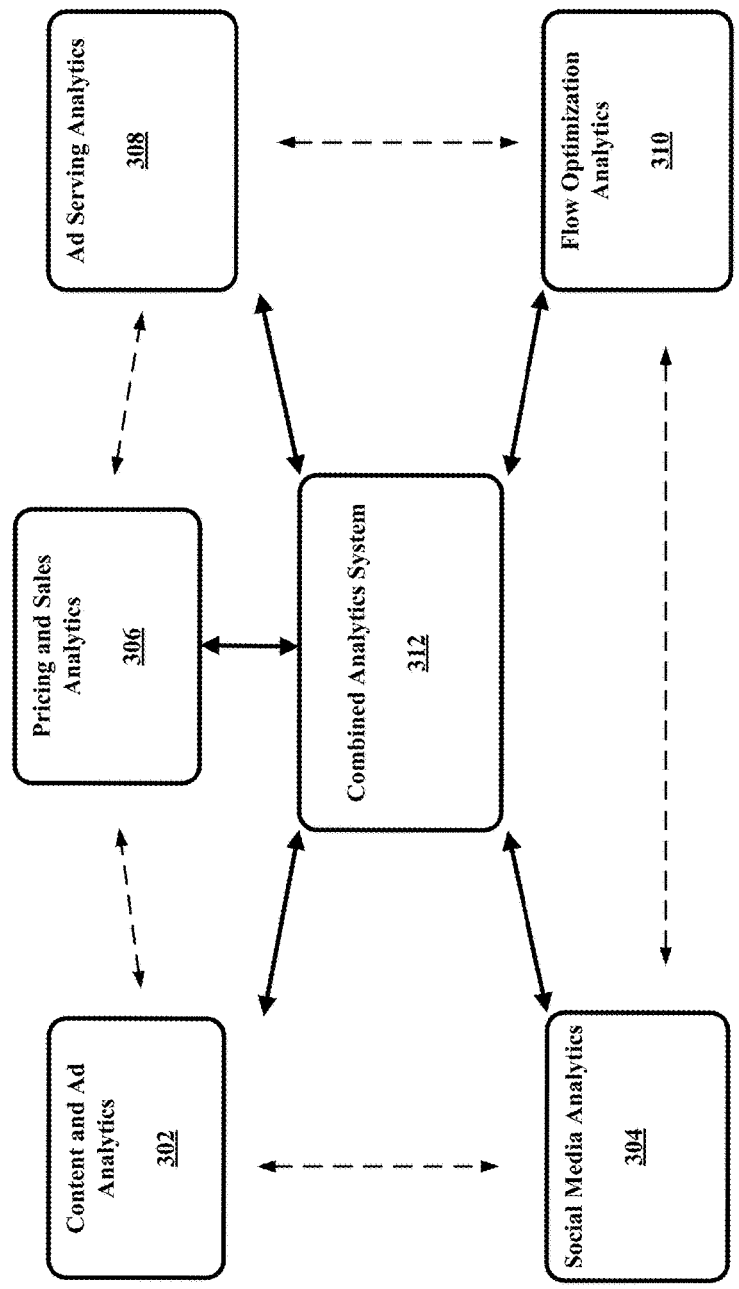
FIG. 3 is a conceptual data flow diagram illustrating the data flow between different means/components in an example system in accordance with aspects presented herein.

FIG. 3 illustrates an example flow of information into the analytics system. The analytics system may then generate and/or update the advertising metrics in order to select targeted advertising having a highest ROI and QoE delivery. Additionally, content programming may be selected using the analytics system in order to create a content and targeted advertisement combination that further increases the ROI and QoE.

FIG. 3 illustrates the analytics aspects that may be combined in a combined analytics system 312, e.g., in order to generate and update metrics for use in selecting advertisements to be presented at content viewing devices with media content.

For example, content and advertisement analytics 302 may be formulated and used to determine content and advertisement creation and selection. Such analytics may also be used to create or select a programming mix. In an automated manner, historical programming and sales may be used to define and prioritize topics for media content and advertisements that provide the best performance for both viewership and/or revenue. In addition, ad styles, target profiles may be identified and prioritized using content and advertisement analytics. This may include accounting for duration, placement, targeting, and messaging, among others. The content and advertisement analytics may be used to identify a best ROI through a combination of both content and advertisements. For example, the best ROI may correspond to the best predicted return on payment for an advertisement or for an advertisement campaign.

Social media analytics 304 may receive, analyze, and search current, or recent, information on social media. For example, the social media analytics may monitor social media sources to identify trending topics and to determine the effectiveness of previously displayed advertisements. Social media pre-production, production, and post-production advertisement feedback metrics used to drive viewership may be used to calculate both content and advertisement effectiveness. For example, the social media analytics may measure the effectiveness of advertisements using a number of data points, including, e.g., creative, content type, messaging, demographic, geographic location, social media platform, time of day, etc. For example, various social media platforms may be continuously monitored in order to identify trending topics. The identified trending topics may be used to select content and/or advertisements for delivery to a content viewing device. Additionally, trending topics may be used to select content/type/creative for the creation of content or advertisements.

Flow Optimization Analytics 306 may be used to continually update performance optimization of the advertisement being sent to the content viewing device. This may include, e.g., real time monitoring of infrastructure, CDNs, websites, mobile applications, and connected TVs in order to determine an optimum QoE. This may further include automatically selecting a CDN with the least congestion for distribution of content/advertisements to a content viewing device for the best performance results. This may also include automatically selecting a bitrate for the stream for any given video player based on pre-selected destination profiles. As well, continuous monitoring may allow automated dynamic changes to Internet routing and best stream profile in order to maximize QoE. Additionally, these QoE metrics may then be used to update the ROI calculation as performance of the stream improves addressing "minimum" standards of acceptable performance for monetization.

Advertisement serving analytics 308 may be used to formulate the selection of advertisements and the dynamic insertion of such advertisement into streams of published content. This may include live media streams as well as VOD published content. Information for the advertisement serving analytics 308 may be gathered, e.g., received, from content viewing devices themselves. For example, information may be gathered from OVP and OTT TV players, from social media video publishing, etc. Generated metrics for an advertisement or for an advertisement campaign may be measured and compared to other content and advertisements. By comparing their performance, advertising metrics may be continuously updated. For example, the ROI calculation may be continuously updated based on the gathered information. The metrics and ROI calculation may further be optimized by comparing an advertiser's ad target profile to these metrics and analyzing both a predictive ROI (pre-sales) and a real time result ROI (post sales).

Pricing and Sales Analytics 306 may be used to formulate an ROI analysis for advertisement pricing and sales performance. Among others, such analytics may include metrics based on demographics, geographic location, client profiles, media content served, time of day, category type, live streaming versus on demand type content, source destination, etc. Pricing analytic data may be derived from historical performance based on different pricing models in order to determine a pricing for a specific content type, creative and placement that is estimated to provide a best ROI. Similar to the other analytics, the pricing analytic data may be continuously updated, e.g., using information from the other analytic sources, e.g., 302, 304, 308, and 310.

Thus, the analytics system 312 may merge data from any of the different analytics sources 302, 304, 306, 308, and 310 in order to generate a single set of combined advertising metrics. The advertising metrics may use the data from the different sources to generate metrics for selecting advertisements predicted to have the best ROI and for adding those selected advertisements to media content for delivery to a content viewing device.

Additional tools may be provided that track the impact/effectiveness of an advertisement or an advertisement campaign. The tools may provide a performance based review, e.g., comparing an amount of sales to an amount paid for an advertisement campaign.

A combination of the analytics 302, 304, 306, 308, and 310 and sharing metrics among different analytics components enables the selection/creation of programming and targeted advertising that is predicted to have a highest ROI. Additionally, the consideration of QoE delivery in combination with the other analytics allows a broadcast a significant advantage.

Figure 4:
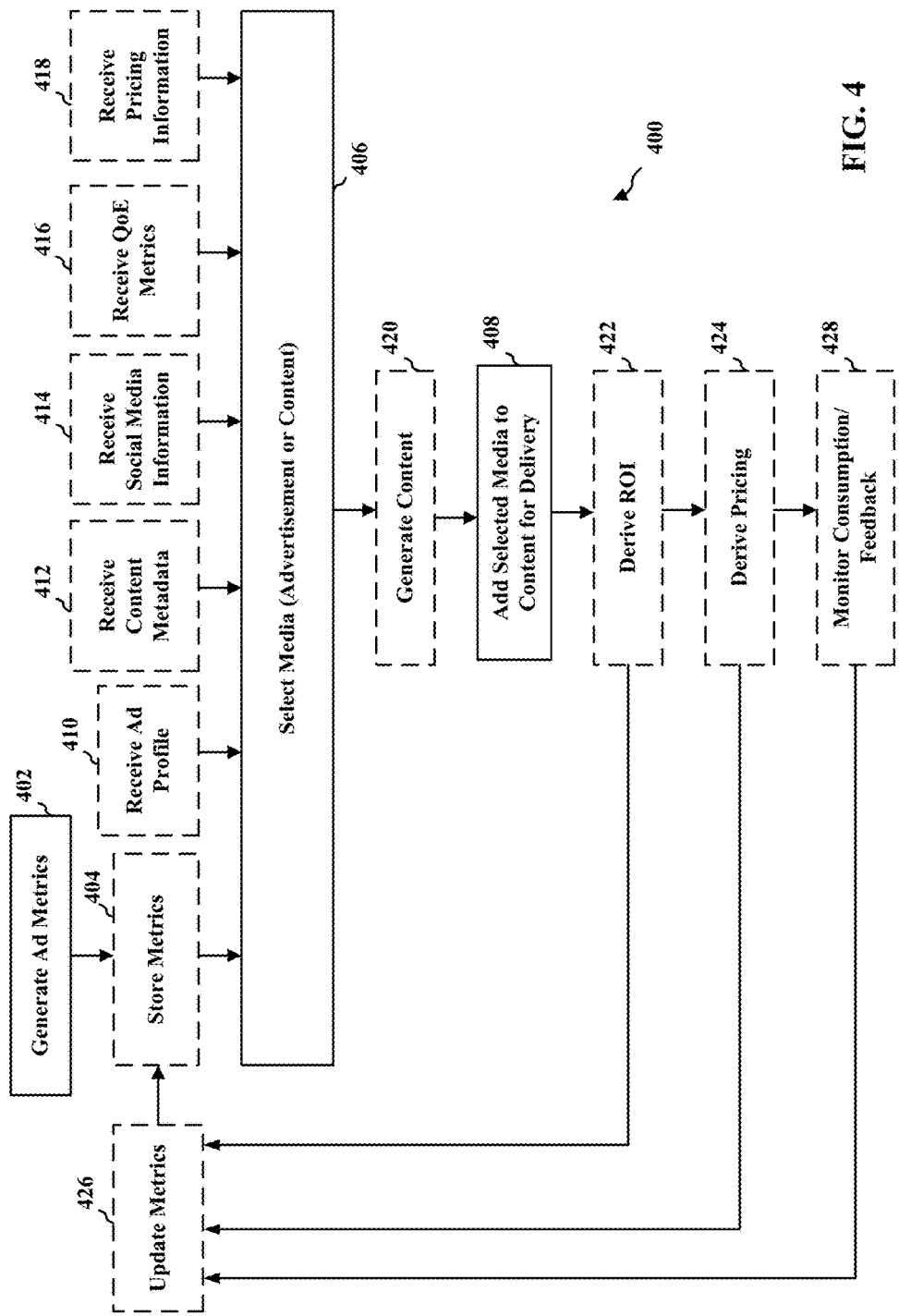
FIG. 4 is a flow chart of an example method for managing advertising in media broadcasts in accordance with aspects presented herein.

FIG. 4 is a flowchart of a method 400 of selecting media, e.g., advertisements or content, for addition to media content for delivery. The method may be performed, e.g., by a broadcast advertisement analytics system, e.g., such as analytics system 30, 200, 312. At 402, the system generates a plurality of advertising metrics from data originating from a plurality of content viewing devices, e.g., 50. These advertising metrics may include, e.g., analytics to drive ad decisioning and dynamic insertion into live streams, VOD, OTT, on-demand, internet or mobile based content delivery, traditional broadcasts, etc. Information regarding published content may be gathered from OVP & OTT TV Everywhere Video Players as well as from "Social Media" video publishing measuring campaign metrics with comparisons to other content and served ads to "continuously" drive the development and update of the advertising metrics that can be used to calculate an optimized advertising campaign.

Once generated, the advertising metrics may be stored, e.g., at 404. Optional aspects in FIG. 4 are illustrated with a dashed line.

At 406, the system selects media, e.g., an advertisement or content, for presentation in connection with content directed to at least one of the content viewing devices. The media may be selected based on the advertising metrics generated at 402. For example, an advertisement may be selected from a plurality of potential advertisements.

At 408, the system, adds the selected media to the content for delivery to the content viewing device(s). Once selected, the media, along with the content, may be encoded/transcoded and transmitted to a content delivery network for transmission to the content viewing device. Where the selected media being selected is an advertisement, for example, the system may receive a transmission and use segment demarcations or advertisement breaks in order to trigger the selection of an advertisement.

In addition to receiving the advertising metrics generated at 402, the system may further receive an advertising profile for the media, e.g., content or advertisement, at 410. The selection of the advertisement at 406 may be further based on the advertising profile for the media. An advertisement target profile may be compared to metrics maximizing performance, e.g., maximizing a ROI calculation. This comparison may be made in order to generate predictive (pre-sales) and/or post sale ROI. Among others, the advertising profile may include e.g., any of a target demographic, geo-location, client profiles, content type, time of day, category type, live streaming or on-demand, source destination, price, etc.

The system may further receive metadata at 412 associated with content for delivery to the content viewing device. Among others, the metadata may include, e.g., any of a content topic, time, date, demographic, creative, etc. When the system receives media content that will be transmitted to a content viewing device, in addition to using segment demarcations in order to identify advertisement breaks, the system may also strip/access metadata from the content. The advertisement may be selected, at 406, based further on the metadata for the content.

The system may further receive information regarding social media at 414. Thus, at least a portion of the data may be originated from a social media application on one of the content viewing devices. Social Media pre-production, production and post-production campaign feedback metrics to drive viewership may be used to calculate ad effectiveness, as well as content selection/creation. Various types of social media information/data points may be received, e.g. regarding any of by various data points such as creative, content type, messaging, demographic, geo-location, platform (Facebook, Twitter, etc), time-of-day, etc. Thus, the selection of the advertisement at 406 may further be based on the received social media information.

In addition to social media, at least a portion of the data used for generating the advertising metrics may originate from a television connected to a packet based network.

The system may further receive content player information from each of the content viewing devices at 416. This may include information regarding the content viewing device itself or about the quality of playout at the content viewing device, such as a bit rate, buffering levels, as well as other demographic information about the content viewing device. This may also provide characteristics regarding the person operating the content viewing device. This may include a geographic location, viewing/searching characteristics from the content viewing device, etc. The advertisement may be selected at 406 based further on the received QoE information. Thus, QoE analytics may be used to automatically drive performance optimization with real time monitoring of infrastructure, CDNs, websites, mobile apps and connected TVs to optimize QoE. This may include automatically selecting which CDN to choose for delivery of the advertisement. In another example, a bitrate may be automatically selected to stream for any given video player based on pre-selected destination profiles. In addition, continuous monitoring of QoE at a content viewing device allows automatic dynamic changes to Internet routing and best stream profile in order to maximize QoE. As well, these QoE metrics may then be used to update an ROI calculation as performance improves.

Thus, at least a portion of the data used to generate the advertising metrics at 402 may be obtained by mining analytic data at a video player on a content viewing device, whether web based, mobile based, or television based.

The system may further receive pricing or sales information at 418. The selection of the advertisement at 406 may be further based on the received pricing or sales information. This allows the media selection to be based on budget in addition to other metrics, such as advertising profiles, creatives, etc. Thus, the selection of the media may further include an analysis regarding ad pricing and sales performance. This analysis may be further based on other received information, including, e.g., information such as demographics, geo-location, client profiles, content served, time of day, category type, live streaming or on-demand and source destination. Pricing analytic data may be derived from historical performances based on different pricing models to automatically determine a best pricing for a specific content type, creative and placement, for example.

The information received at any of 410, 412, 414, 416, and 418 may also be incorporated into the advertising metrics. For example, such information may be used to generate the initial ad metrics and/or may be used to update the advertising metrics.

The metrics and received information may be used, not only to select an advertisement for presentation at a content viewing device, but may also be used for the creation of content itself. Thus, the metrics and information may be used to identify a topic of interest or that would generate a maximum number of views or that would combine with an advertisement to generate a maximum number of views to a particular audience so that an optimum content/advertising combination may be created. Thus, at 420, the system may use the advertising metrics and any of the received advertising profile, content metadata, social media information, QoE metrics, and advertisement pricing information to identify content for creation. This may include, e.g., identifying trending topics, topics of general interest, types of content, etc. that are of particular interest to consumers.

The creation of content may be based on any of viewing performance metrics, social media topic trend metrics, social media content sharing metrics, and advertising performance metrics. Social media content sharing metrics may include a quantity and/or duration of the sharing, e.g., minutes, hours, days, weeks, etc.

The content may be selected to be of interest to a maximum number of content viewers or to a particular demographic of content viewers. The content may be identified that will form a financially beneficial combination with a particular advertisement or advertisement campaign.

Thus, the generation of content at 420, or the identification of content for generation, may include analyzing what combination of content and advertisement works best, e.g., provides the highest ROI. Thus, content may be created and advertisements may be selected to form a content and advertisement combination that maximizes an estimated ROI. This analysis may be broken down by demographics. Thus, the analysis may identify the content and advertisement combination that performs the best for a particular demographic. This analysis may be used in order to identify content for creation. The identification of content may further be based on an advertisement profile for a particular advertisement or advertisement campaign, in order to create a combination of content with which such advertisements may be inserted in order to generate the best ROI for the advertisement or advertisement campaign.

The system may further derive a ROI at 422 for adding the advertisement to the content. The ROI may be derived, e.g., based at least in part on the advertising metrics. The ROI may be a predicted ROI. Additionally, the system may monitor consumption and/or viewer feedback so that the ROI may comprise a real-time result or "post-sales" ROI. The ROI may be derived from the advertising metrics, the advertising metrics including multiple analytics comprising at least two of content analytics, advertising analytics, social media analytics, quality of experience analytics, sales analytics, and pricing analytics.

This ROI may be determined at 422 not only for a particular display of an advertisement, but for an advertisement campaign, as well. Thus, the method may comprise tracking the impact/effectiveness of an advertisement or an advertisement campaign. This may include making a performance based analysis, e.g., comparing an amount of sales to an amount paid for an advertisement campaign. The analysis may include measuring content viewing, e.g., both traditional broadcast viewing and/or internet streaming. The analysis may also include measuring the purchases by those same individuals or same demographic.

This information may be used along with the advertising metrics, the Advertisers "Ad Target Profile", and/or content metadata, to maximizing performance. These aspects may also be used to generate both "predictive" (pre-sales) and "real time results" (post-sales) ROI reports.

The ROI may be based further on the QoE associated with the content viewing device. The QoE may be monitored, and as QoE information is received, e.g., at 416, video and/or advertisement transmission may be rerouted in order to maximize a QoE for the content viewing devices. This may be done, e.g., on a software as a service (SaaS) model. In addition to rerouting the transmission, an advertisement may be selected based on the monitored QoE information in order to drive performance optimization. This may include, e.g., real-time monitoring of infrastructure, CDNs, websites, mobile applications, and connected televisions in order to optimize QoE for an advertisement/advertisement campaign. Aspects may include automating the selection of any of a CDN, a bitrate for streaming for a given video player, etc. These selections for the transmission may be based on pre-selected destination profiles.

Continuous monitoring allows automated dynamic changes to internet routing and a best stream profile in order to maximize QoE. These metrics can then be used to update the ROI calculation as performance improves. For example, these metrics can be used to update the advertising metrics at 426. The updated advertising metrics may be used to calculate an updated ROI.

Additionally, the system may derive pricing at 424 for adding the selected advertisement to the content, the pricing being derived, at least in part, from the advertising metrics.

Although the ROI and pricing determinations are illustrated in a block after the selection of the advertisement, these aspects may be performed as a part of the selection at 406 of the advertisement itself. Additionally, the derived ROI and derived pricing may be incorporated into the advertising metrics. Thus, at 426 the system may update the advertising metrics based on this new information.

The system may continue to monitor viewing of the advertisement and/or feedback regarding the advertisement at 428. Feedback may be obtained regarding the creative aspects of the advertisement. An analysis regarding the efficacy of the advertisement may also analyze the context in which the advertisement was presented to the content viewing device. For example, the content with which the advertisement was presented may be analyzed. For example, certain customer groups may respond to a particular type of advertisement over another. Thus, this analysis allows the identification of the context in which the advertisements are most effective.

The analysis may include an analysis of the effect for a target market. The analysis may include an analysis of whether the sales were made at a higher product price, or whether the sales were discount driven.

This feedback information, along with other received data can be used to update the advertising metrics, e.g., at 426.

Thus, the advertising metrics are continually updated to reflect a changing content viewer environment into which advertisements will be transmitted. This includes not only QoE changes, but also addresses ongoing changes in viewers' interests.

Although the advertising metrics are illustrated as being separate from the information regarding the advertising profile, social media information, pricing information, QoE information, and content metadata, any of these sources of information may be used in generated and/or updating the advertising metrics.

Figure 5:
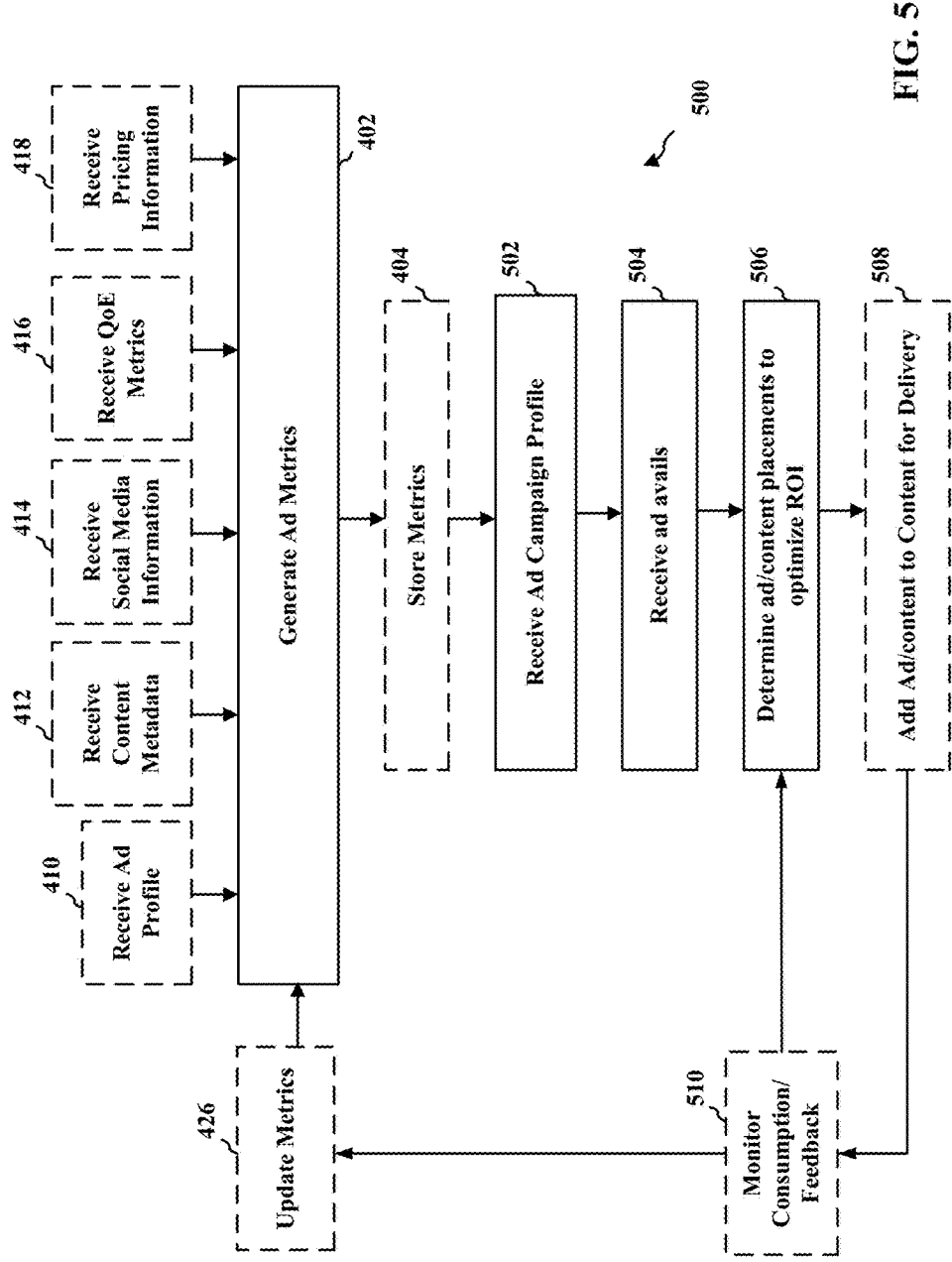
FIG. 5 is a flow chart of an example method for managing advertising in media broadcasts in accordance with aspects presented herein.

FIG. 5 illustrates a flowchart of aspects of a method 500 of selecting media, e.g., advertisements or content, for addition to media content for delivery. The method 500 may include the receipt of information from a number of sources and the generation of advertising metrics, as described in detail in connection with FIG. 4. The same references numbers are used for these sources of information and the generation, storage, and update of advertising metrics.

As illustrated in FIG. 5, once the advertising metrics are generated at 402, an advertising profile for an advertising campaign may be received at 502. The profile may include information similar to that descried for advertisement profile 410, and may include a price to be paid for the advertising campaign. The advertising profile may be for a single advertisement or may comprise a plurality of advertisements. The plurality of advertisements may differ in type, creative, demographic, geographic location for placement, etc.

At 504, ad avails may be received. The system may identify, for example, openings or opportunities for the insertion or delivery of advertisements and content. The ad avails provide an indication of available advertisement placement positions, slots, etc. The system may use the information in the advertising campaign and the generated advertising metrics to determine an optimum placement of advertisements/content in order to generate an optimum ROI at 506. For example, the system may identify a placement for a single advertisement that is predicted to generate the highest ROI for the price indicated in the advertising profile. Similarly, the system may identify a combination of placements at a plurality of ad avails having a highest predicted ROI for the price indicated in the advertising profile. As well, when the advertising profile includes a plurality of advertisements, the system may identify a combination of placements for the plurality of advertisements that having a highest predicted ROI for the price indicated in the advertising profile.

At 508, the system may also automatically add an advertisement/content from the advertisement profile to content for delivery to a content viewing device at the placement identified in 506.

Once the advertisement/content has been delivered to a content viewing device at 508, the system may monitor feedback and/or consumption at 510 in order to update the advertising metrics at 426. Likewise, the system may update the determination of the advertisement placements at 506 for future ad avails based on the feedback received at 510.

An article of manufacture e.g., such as systems 100, 200, 300 may include components that perform each of the blocks of the algorithm in the aforementioned flowcharts of FIG. 4 or FIG. 5. As such, each block in the aforementioned flowcharts of FIG. 4 and/or FIG. 5 may be performed by a component and the article of manufacture may include one or more of those components. The components may be, e.g., one or more hardware components specifically configured to carry out the stated processes/algorithm, implemented by a processor configured to perform the stated processes/algorithm, stored within a computer-readable medium for implementation by a processor, or some combination thereof.

Figure 6:
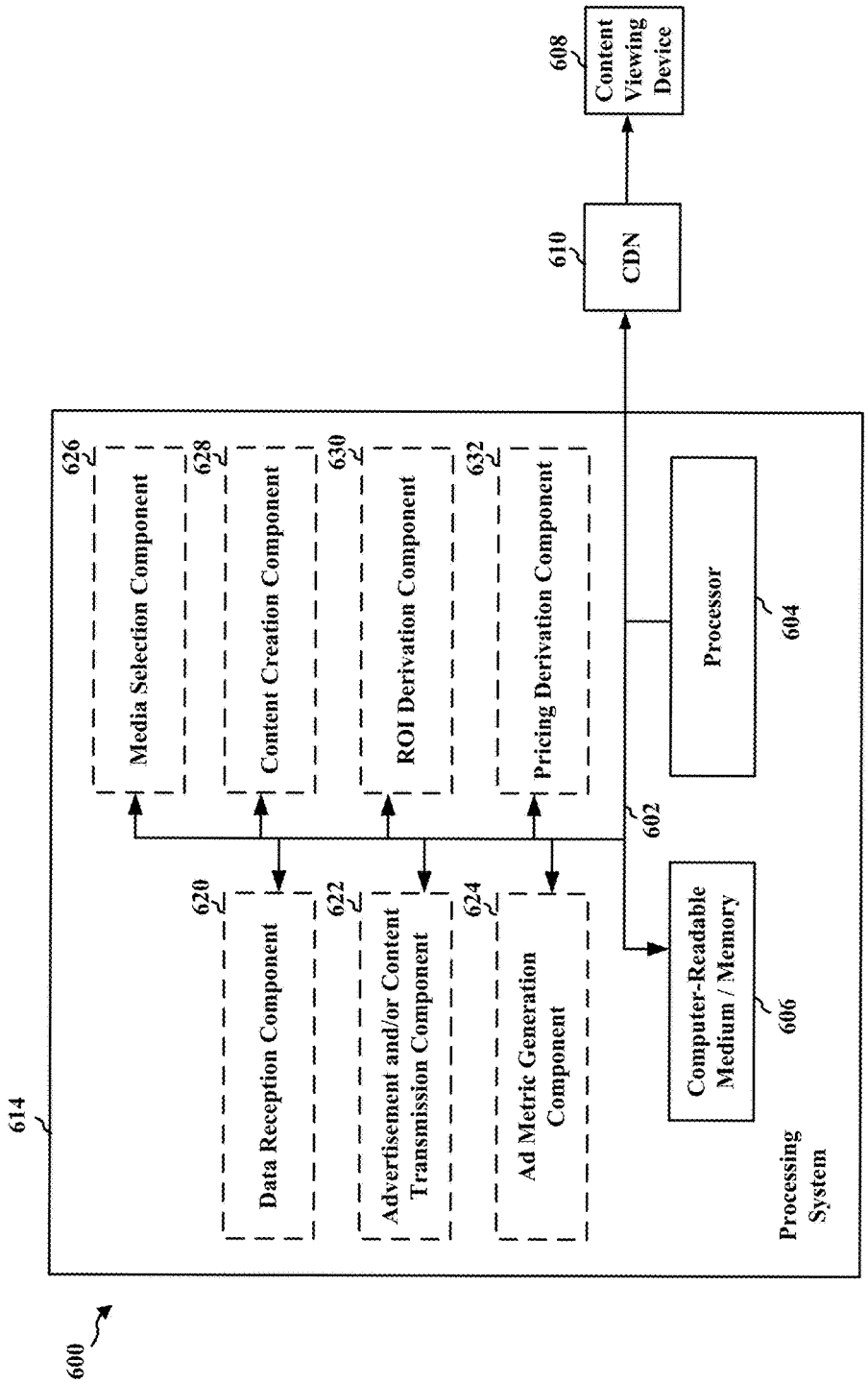
FIG. 6 is a diagram illustrating an example of a hardware implementation for a processing system in accordance with aspects presented herein.

FIG. 6 is a diagram 600 illustrating an example of a hardware implementation for an article of manufacture employing a processing system 614. The processing system may include a data reception component, e.g., configured to receive data relating to advertising profiles, content metadata, social media information, QoE measurements, pricing information, advertisement campaigns, feedback regarding advertisement or content, ad avails, consumption related to advertisements, etc. The processing system may include an advertisement and/or content transmission component 622 that adds an advertisement to content for delivery to a content viewing device. The processing system may include an advertising metric generation component 624 that generates and updates advertising metrics using information from a plurality of sources, such as those described in connection with data reception component 602. The processing system may include advertisement media selection component 626 that selects media, e.g., advertisements or content, to be matched with content and to be directed to at least one content viewing device using the advertising metrics generated at 624 and an advertisement profile. The processing system may include a content creation component 628 that identifies content to be created based on the advertising metrics generated at 624. For example, content may be identified that is predicted to provide a high ROI for advertisers. The processing system may include an ROI derivation component 630 that derives an ROI for adding the selected media to the content using the generated advertising metrics. The ROI derivation component 630 may also use QoE information in the derivation. The processing system may also include a pricing Derivation component 632 configured to derive pricing for adding the selected media to the content. The pricing may be derived from the advertising metrics.

The processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors and/or hardware components, represented by the processor 604, the components 620, 622, 624, 626, 628, 630, 632, and the computer-readable medium/memory 606. The bus 602 may also link various other circuits such as timing sources, peripherals, voltage regulators, and power management circuits, which are well known in the art, and therefore, will not be described any further.

The processing system 614 may be coupled to at least one CDN 610 involved in the transmission of content and/or advertisements to at least one content viewing device 608. The CDN provides a means for communicating with various other apparatus over a transmission medium. Data may also be received over such a network for updating the advertising metrics. The receiving component receives data from one or more sources, extracts information from the received signal, and provides the extracted information to the advertising metric generation component. In addition, advertisement(s) and/or content may be sent from processing system 614 for transmission over CDN 610 to content viewing device 608, e.g., from transmission component 622. The processing system 614 includes at least one processor 604 coupled to a computer-readable medium/memory 606. The at least one processor 604 is responsible for general processing, including the execution of software stored on the computer-readable medium/memory 606. The software, when executed by the processor 604, causes the processing system 614 to perform the various functions described supra for any particular system. The computer-readable medium/memory 606 may also be used for storing data that is manipulated by the processor 604 when executing software. The processing system 614 further includes at least one of the components 620, 622, 624, 626, 628, 630, 632. The components may be software components running in the processor 604, resident/stored in the computer readable medium/memory 606, one or more hardware components coupled to the processor 604, or some combination thereof.

The processing system 614 may also include a communications interface, which allows software and data to be transferred between processing system 614 and external devices. Examples of such a communications interface may include a modem, a network interface (such as an Ethernet card), a communications port, a Personal Computer Memory Card International Association (PCMCIA) slot and card, etc. Software and data transferred via communications interface may be in the form of signals, which may be electronic, electromagnetic, optical or other signals capable of being received by communications interface. These signals may be provided to communications interface via a communications path (e.g., channel). This path may carry signals and may be implemented using any of wire or cable, fiber optics, a telephone line, a cellular link, a radio frequency (RF) link and/or other communications channels.

The processing system 614 may be a component of a broadcast network system at the facility itself or as a cloud-based service whose resources may be located at the facility or remotely.

In one configuration, the article of manufacture 600 includes means for generating a plurality of advertising metric, means for selecting an advertisement, means for adding the advertisement to content for delivery, means for deriving an ROI for adding a selected advertisement to the content, means for deriving pricing for adding the advertisement to the content, and means for creating content based on advertising metrics. The aforementioned means may be one or more of the aforementioned components of system 100, 200, 312 and/or the processing system 614 of the article of manufacture 600 configured to perform the functions recited by the aforementioned means.

The method, system, and computer program product of the present disclosure enable an individual to view real-time or customized media productions. Additionally, the present disclosure enables a hosting facility to automatically link advertisements or other types of messages to a specific media production or show (or a specific show element/story) by time, duration, and/or topic, or any other desired criteria.

FIG. 7 illustrates an example of a distributed advertisement network 700 that comprises a plurality of advertisement management systems. Such a system may include both a National, or larger regional, advertising system 702, and affiliate advertising systems 704(a)-704(n). A Central host server 710 may reside at the facility for a national internet service provider (ISP), such as AOL, AT&T, Verizon, or the like or cloud-based service such as Amazon AWS or Microsoft Azure or private cloud and/or network operations center (NOC). In an embodiment, central host server 710 resides at the facility for a national information service provider that offers information content, such as news, entertainment, travel, history, art, business, education, science, health, recreation, careers, and/or the like. An information service provider primarily hosts a national portal operating over the Internet, such as Verizon/AOL, MSN, Yahoo, Google, Facebook, and the like. An information service provider also includes web sites operated by major networks (such as, CNN, MSNBC), local broadcasting networks, private/personal web sites or homepages, and the like.

Central host server 710 may include an advertising management database for tracking availabilities, demographics, pricing, social media, QoE, content metadata, historical advertisement metrics, and for generating and updating advertising metrics, as discussed herein.

Central host server 710 may also include an advertisement database for storing national advertisement media for national advertisement campaigns and/or a media database for encoding and transmitting media productions with linear advertising, e.g., as described in connection with FIG. 1.

Local host servers 720(a)-720(c) may be located within the local geographical areas of a corresponding affiliate advertising system 704(a)-704(n). As shown, an affiliate advertising system 704(a)-704(n) does not necessarily communicate with a corresponding local host server 720(a)-720(c). Affiliate advertising systems 704(b) and 704(d), for example, may communicate directly with central host server 710.

Local host servers 720(a)-720(c) may also include local databases and processing system similar to those for the central host server 710.

Each affiliate advertising system 704(a)-704(n) includes components of system that enables the sale and distribution of advertising in its respective local or regional market. In other words, local advertisements may be sold and managed by each affiliate advertising system 720(a)-720(n).

Additionally, some affiliate advertising systems 704(a)-704(n) interact with a central advertisements server or media server at central host server 710 for integrating and serving media and advertisement productions to client-recipients, as described herein. Affiliate advertising systems may communicate with both central host 710 and a corresponding local host in order to fill different ad avails at different times.

Central host server 710 may periodically poll, update, and/or synchronize information from the local host servers 720(a)-720(c) with the central records. The periodic communications enable national advertisement server to collect, verify, and modify information related to advertisement sales, reporting, accounting, trafficking, social media information, QoE, user authorization, and/or the like, as described herein, at a national level.

National advertising system 702 may provide national advertisements that can be selected and/or sold to the local markets managed by each affiliate advertising system 704(a)-704(n). In an embodiment, national advertisements (from national advertising system 702 or central host 710) may be served in open advertising spots by the traffic modules of affiliate advertising system 704(a)-704(n). Open advertising spots may be defined by locations or time slots which are not sold locally by show, show segment, topic, or the like. Affiliate advertising systems 704(a)-704(n) may execute a media priority scheme, described in greater detail below, that enables local exclusive and target advertisements to be served prior to national exclusive and targeted advertisements. National exclusive and targeted advertisements may be served before local non-targeted advertisements. Local non-targeted advertisements may likewise be served prior to national non-targeted advertisements, or can be configured to be shared by rotating between local and national non-targeting advertisements.

Media content may be live or as-live with a time shifted distribution. As-live content may include the same linear and non-linear advertisements as the live content or may include at least one new advertisement inserted according to the advertisement selection described herein.

By way of example and without limitation, the aspects of the present disclosure are presented with reference to systems and methods used to configure various components of a media production system that may be used for production of television programming or at sports events. The various concepts presented throughout this disclosure may be implemented across a broad variety of media production/advertisement systems.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for."

What is claimed is:

1. A system for selecting advertisement for delivery to at least one content viewing device, comprising:
   a memory; and
   at least one processor coupled o the memory and configured to:
      receive data originating from a social media application on a first device of a plurality of content viewing devices;
      receive data originating from a second device of the plurality of content viewing devices that is connected to a packet based network;
      generate a plurality of advertising metrics from the data originating from at least the first device and the second device and store the plurality of advertising metrics in the memory;
      receive and store quality of playout of content on each of at least the first device and the second device, the quality of playout of content including birate and buffering levels for the content to be transmitted and displayed on each of the first and second device;
      apply the plurality of advertising metrics to an analytics engine that includes at least one of content analytics, advertising analytics, sales analytics, pricing analytics, and social media analytics to generate a set of advertising metrics;
      select media for the content directed to one of the first and second devices based on the generated set of advertising metrics and based on the stored quality of playout of content associated with the one of the first and second devices; and
      add the selected media to the content for delivery to the one of the first and second devices.

2. The system according to claim 1, wherein the at least one processor is further configured to automatically select at least one content delivery network (CDN) to deliver the selected media added to the content to the one of the first and second devices, wherein the at least processor selects the at least one CDN to maximize a quality of experience (QoE) at the one of the first and second device.

3. The system of claim 2, wherein the maximized QoE is determined based on at least one of:
   a quality of service (QoS) performance measurement associated with a physical transmission of the content and the media to one of the first and second devices,
   a performance measurement regarding infrastructure involved with the physical transmission of the content and the selected media to the one of the first and second devices,
   a performance measurement regarding a content delivery network involved with the physical transmission of the content and the selected media to one of the first and second devices,
   a performance measurement regarding a web site involved with the delivery of the content and the selected media to the one of the first and second devices,
   a performance measurement regarding a mobile application of the one of the first and second devices involved with the delivery of the content and the selected media, and
   a performance measurement regarding reception of the content and the selected media by the one of the first and second devices.

4. The system of claim 3, wherein the at least one processor is configured to generate a best stream profile based on the determined maximized QoE and to automatically and dynamically change a routing of the selected media to the one of the first and second devices based on the generated best stream profile.

5. The system according to claim 1, wherein the at least one processor is further configured to automatically select the bitrate for a data stream to deliver the selected media to the one of the first and second devices, wherein the at least processor selects the bitrate for the data stream to maximize a quality of experience (QoE) at the one of the first and second device.

6. The system of claim 1, wherein the generated plurality of advertising metrics comprise social media content sharing metrics including at least one of a quantity of sharing of the social media content and a duration of the sharing of the social media content.

7. The system of claim 1, wherein the at least one processor is further configured to select the media based on metadata associated with the content with which the selected media will be added for delivery to the one of the first and second devices.

* * * * *